AUTOMATIC CALLING LINE IDENTIFICATION CIRCUIT

Filed Feb. 27, 1963 4 Sheets-Sheet 1

INVENTORS H. R. MOORE
W. T. SEARS
BY
Howard R. Popper
ATTORNEY

AUTOMATIC CALLING LINE IDENTIFICATION CIRCUIT

Filed Feb. 27, 1963 4 Sheets-Sheet 3

United States Patent Office 3,243,514

Patented Mar. 29, 1966

3,243,514

AUTOMATIC CALLING LINE IDENTIFICATION CIRCUIT

Harold R. Moore, Middletown Township, Monmouth County, and William T. Sears, Middletown, N.J., assignors to Bell Telephone Laboratories, Incorporated, New York, N.Y., a corporation of New York Filed Feb. 27, 1963, Ser. No. 261,264
16 Claims. (Cl. 179—17)

This invention relates to telephone systems and more particularly, to such systems wherein means are provided for automatically identifying the telephone number corresponding to a calling line.

The growth of telephone systems has been accomplished in recent years by the increased use of various automatic arrangements whereby additional customer telephone service may be provided without unduly burdening the amount of telephone plant in use. In addition, provision had to be made for adapting already existing telephone equipment for some of the more contemporary improvements which involved various automatically operative schemes.

One area which has been particularly emphasized is that of calling line identifiers. Priorly, special service calls such as long distance and other toll requests were handled only through direct manual supervision. This naturally required a great deal of participation on the part of telephone operators and other supervisory personnel, often tying up much-needed equipment for rather extended periods of time. In order to alleviate this, some systems has been developed whereby the telephone subscriber may initiate and even complete such toll calls on a more automatic basis. In arrangements involving Direct Distance Dialing, however, operator intervention was and still is often required in order to determine the calling subscriber's identity.

Further developments in the light of this problem resulted in various automatic calling line identification systems such as those disclosed in D. S. Barlow Patent 2,672,515, issued March 16, 1954, and Cahill et al. Patent 3,071,650, issued January 1, 1963. These systems, while wholly satisfactory for the purposes for which they were developed, are only economically applicable to the larger telephone offices or often only in tandem offices. Therefore, in smaller offices in which the use of these systems is not deemed practical, there still existed the attendant and relatively expensive manual supervision such as operator intervention.

A rather pressing need therefore existed to develop an arrangement which could be installed in smaller offices, for example, for every 1000 or 100 subscribers depending upon the requirements of an individual office. Such small office identification systems must be capable of being installed, as with other automatic number identification systems, in already-existing offices with a minimum of interference with present equipment.

In addition, certain ones of the prior automatic identification systems for calling lines required a great deal of additional equipment where two-party and multiparty calling lines were involved. For example, the Barlow patent cited supra necessitates the inclusion of separate number network "fields" for tip parties, ring parties and multiparty lines. Furthermore, most of the prior automatic number identification arrangements utilized relatively extensive number networks (e.g., 10,000 crosspoints or terminals for each office), with identification signals being applied to common digital busses through passive electrical elements. This inevitably results in a great attenuation of the identifying signal prior to the actual detection of the signal; amplifier detectors such as those described in the above-mentioned Cahill et al. patent must therefore be capable of amplifying such an attenuated signal perhaps as much as 1,000,000 times in order for proper digital registration to be thereafter achieved.

It is therefore an object of this invention to provide an improved automatic calling line identification circuit.

It is an additional object of this invention to provide such a circuit capable of being installed in a telephone office in combination with existing equipment therein with a minimum of interfering connections thereto.

A further object of this invention is to make such installation economically feasible in small telephone offices wherein the utilization of presently available but more extensive identification systems is impractical.

Yet another object of this invention is to provide an automatic calling line identification system which can identify calling parties on two-party lines without the necessity of separate number network "fields" therefor.

It is a further object of this invention to reduce the number of elements associated with each directory number in the number network array.

Still another object of this invention is to achieve automatic identification of the calling party on a two-party line by the breakdown of discharge elements arranged in unique configurations.

A further object of this invention is to allow the use of less complex detecting equipment.

Additional objects of this invention are attained in one particular embodiment thereof involving an automatic calling line number identification system, the only connection of which to a customer's line is one to the equipment number sleeve thereof. The system may advantageously be used in smaller telephone offices in conjunction with recording and charging equipment common to a plurality of such offices economically located at a tandem or toll office, as in R. N. Breed et al. Patent 2,848,543, issued August 19, 1958.

When a telephone subscriber whose office is provided with the instant invention initiates a call indicative of a particular service request, the local switching system is activated in the usual well-known manner. However, due to the particular significance which the local and remote switching equipment attach to such a special service request, a particular outgoing trunk applies an identification signal to the sleeve lead of the calling party's line, the signal being transmitted to the sleeve through the local switch train. Each equipment number sleeve or terminal is coupled to a single directory number terminal in the case of individual lines, or to two directory number terminals if the calling line is a two-party line.

The directory number terminals are directly connected into a number network and bus system which is arranged on a per 100 number basis. Each directory number terminal has associated therewith a group of gaseous discharge elements which are designed to break down only upon the application of a certain minimum potential. When a calling line with individual service is to be identified as a result of a particular service request, the appearance of the above-mentioned identification signal on the line's directory number terminal causes the ionization of all the discharge devices coupled thereto, the breaking down of one of the lamps providing class, office, thousands and hundreds information to appropriate detecting circuits, and the energization of two of the other lamps providing for tens and units information respectively.

Identification of only the calling party on a two-party line is achieved by uniquely utilizing discharge devices of different firing voltages connected in parallel. Although the identifying potential is applied to the equipment terminal which is common to the directory sleeves of both parties on a two-party line, party detection circuitry is arranged in common with a typical 100 number grouping so as to allow only the lamps associated with the calling party to fire; similarly, only some of the lamps corresponding to the other party on the two-party line are permitted to ionize, this resulting in no identification. The selective breakdown of the tubes associated with the "unwanted" party on the two-party line is achieved by utilizing parallel connected devices, selected ones of which have different breakdown ratings than do others. Where such discrimination is required, therefore, the lower rated devices are arranged to ionize first to the exclusion of the others.

It is therefore a feature of this invention that parallel-connected discharge devices, some of which have discretely different breakdown voltages, are employed in the "number network" of an automatic calling line identification system.

Another feature of this invention is a single number network field for providing directory numbers for both "tip" and "ring" parties, the discharge devices corresponding to such parties capable of being randomly intermingled in the number network.

A further feature of this invention includes facilities for providing party discrimination through the use of only one pair of party test relay contacts for every 100 number group.

Still another feature of this invention is facilities for reducing the number of required detectors through the use of a detector which is common to each 100 number network unit.

A further feature of this invention is less complex detector circuitry made possible by the application of the identifying signal only to the individual equipment number terminal corresponding to the calling line.

These and other objects and features of this invention will become apparent when taken in conjunction with the following description, appended claims and the drawing in which:

Figure 3:
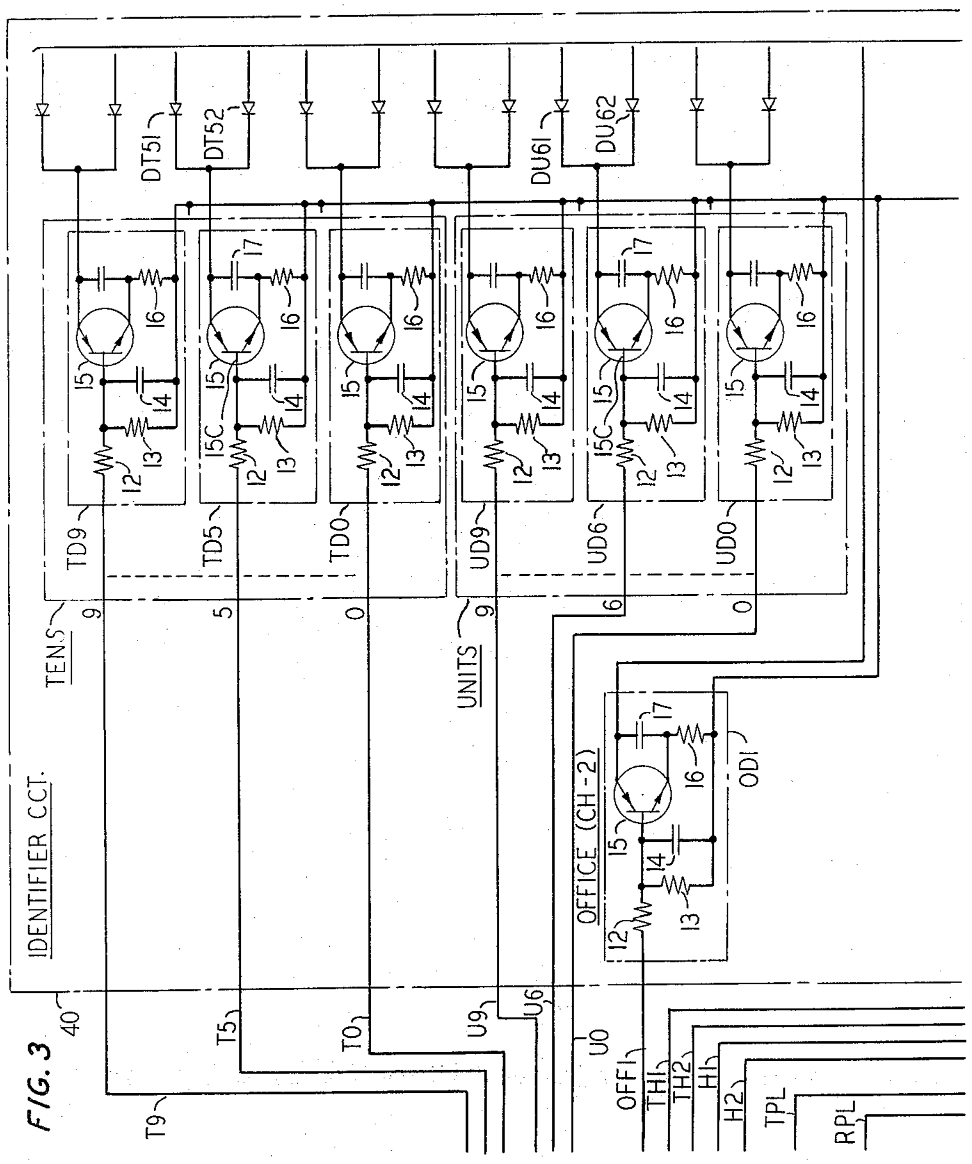
Figure 4:
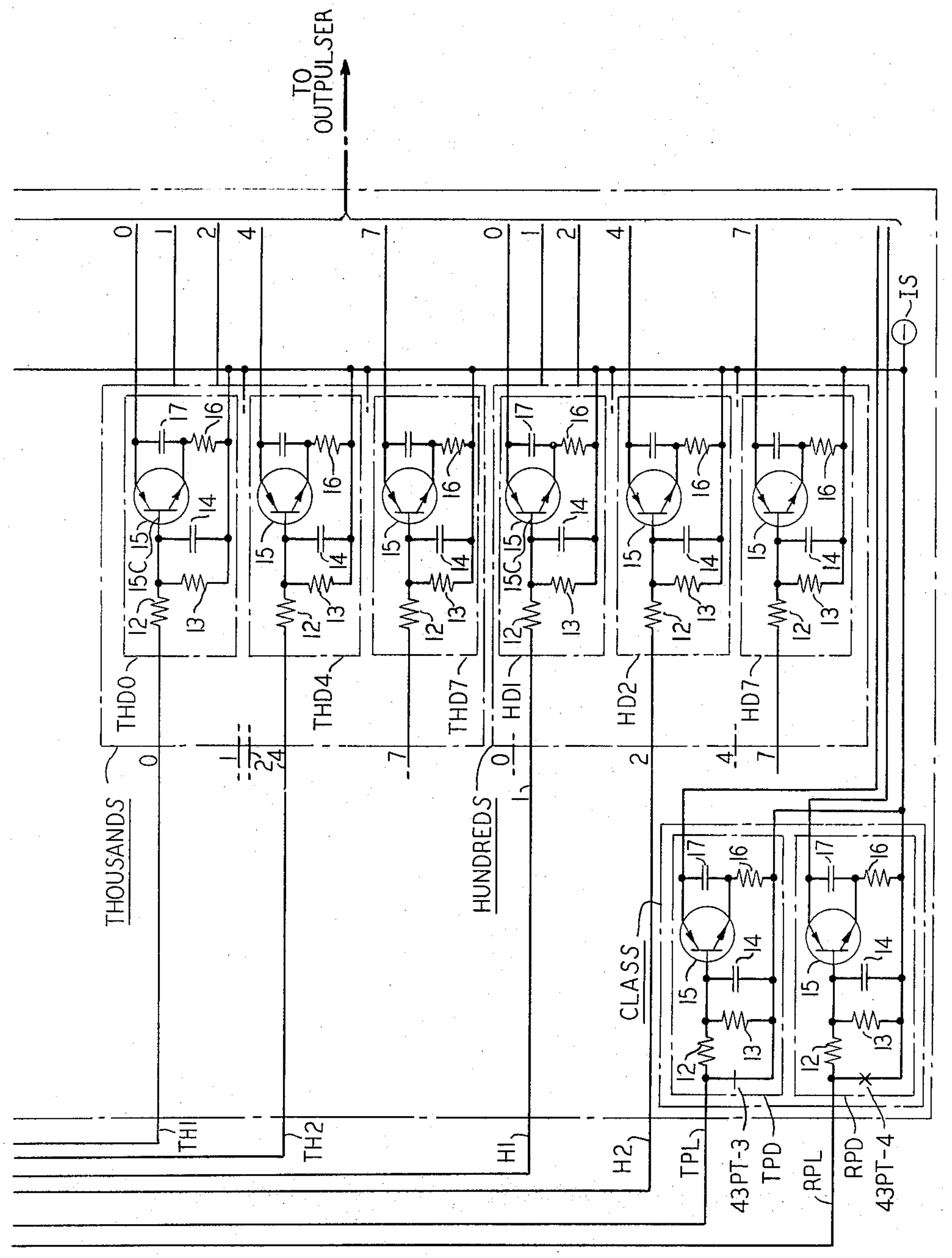

FIGS. 3 and 4 disclose different portions of the identifier circuit; and

Figures 1, 5:
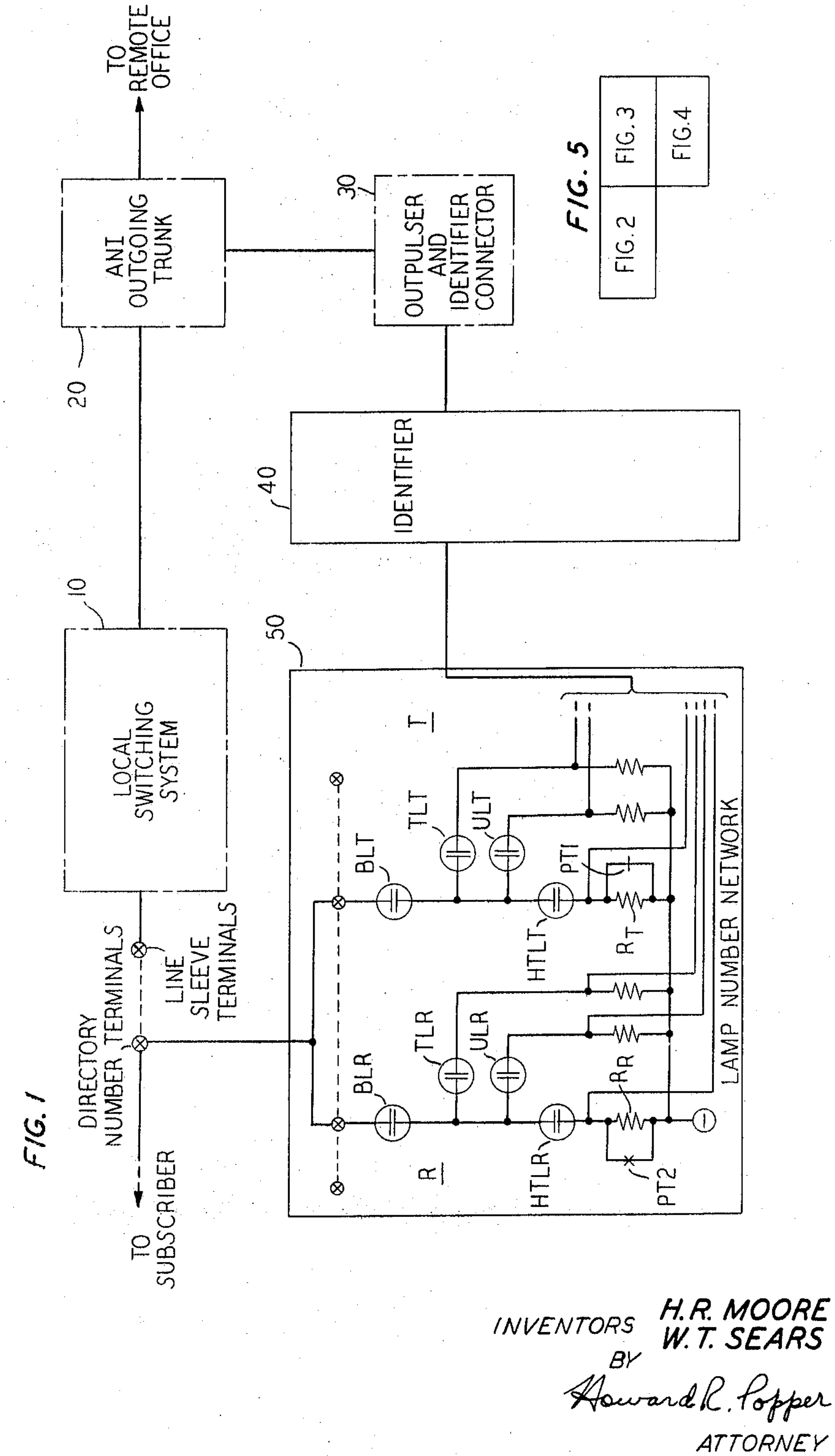
FIG. 1 is a block diagram of the instant calling line identification arrangement as used in conjunction with a telephone switching system.
Figure 2:
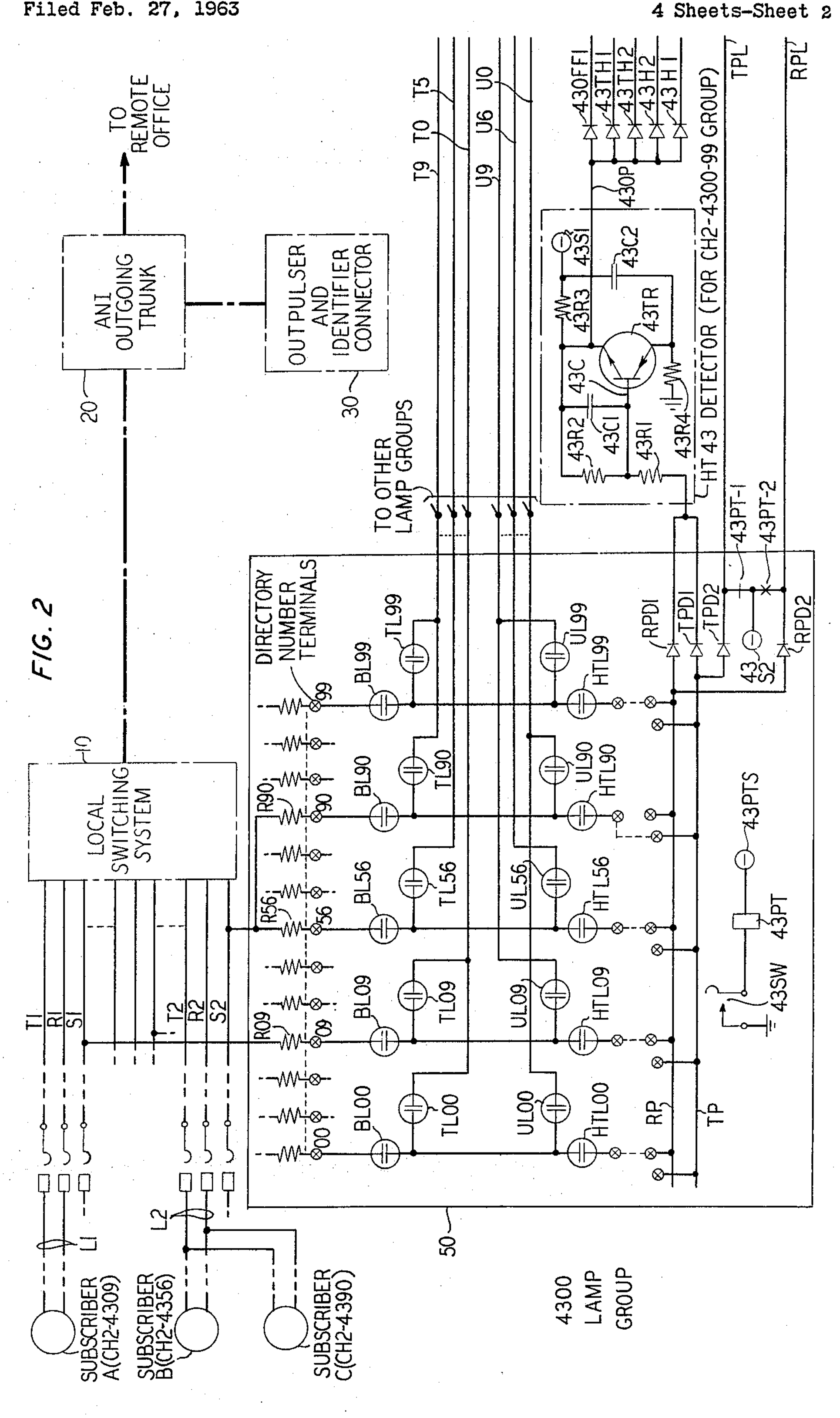
FIG. 2 shows a portion of the lamp number network and its application and connection to certain typical subscribers.

FIG. 5 shows the manner in which FIGS. 2, 3 and 4 should be placed together in order to demonstrate the way in which the various system components cooperate.

In FIG. 1, a block diagram discloses generally the interconnection of the various circuit components in an automatic calling line identification arrangement utilizing the principles of the instant invention. The blocks 40 and 50 labeled respectively as the identifier and the lamp number network, are shown in dark outline form, while the remaining blocks comprising well-known components are surrounded by dotted lines.

*General description—Block diagram (FIG. 1)*

It is initially assumed that calling line identification is desired in response to particular service requests on the part of subscribers; it will be understood that this assumption is made merely for purposes of facilitating the description. When a subscriber initiates a call which fits the particular service request criteria mentioned, the local switching system 10 in FIG. 1 is energized in the normal and well-known manner and the call proceeds through the automatic number identification (ANI) outgoing trunk 20 to a remote office advantageously equipped for initiating the identification process.

The first step in the identification process occurs when the trunk 20 connects to the outpulser and identifier connector 30. Equipment within the identifier connector portion of the block 30 serves to establish a connection to an identifier 40, the latter being connected to a lamp number network such as 50. The ANI outgoing trunk 20 is then signaled to place a special identification signal on the sleeve lead of the calling line through the local switching system 10.

After the identification signal has appeared on the line sleeve terminal corresponding to the calling line after having been transmitted thereto through the local switch train, the signal then traverses the cross-connection in the distributing frame which attaches directory number significance to the calling line. It is to be noted that many contemporary telephone systems exhibit no regular correlation between line sleeve or equipment number terminals and directory number terminals; this being well known, it is readily apparent that a calling line identification system must identify numbers from the directory terminals rather than the line sleeves. Therefore, the identification signal is transmitted to the particular directory number terminal corresponding to the directory number of the calling line.

For example, assume that the calling line is a two-party line, each party being represented in the lamp network 50 by lamp groups R and T respectively. Each lamp group comprises four lamps, three of which have relatively higher breakdown potentials than the remaining one; for example, in ring party group R, lamps BLR, TLR and ULR each break down at a higher voltage than lamp HTLR. Party test equipment (not shown, but see FIG. 2) represented by contacts PT1 and PT2 may be arranged to operate only when a tip party initiates a call. Therefore, the appearance of the identification signal on the common sleeve lead of the two parties in response, for example, to a ring party service request, is arranged to be sufficient to energize lamps BLR and HTLR of group R, and lamps BLT and HTLT of group T.

This may be explained on the basis of the fact that the firing time of a lamp depends upon the "overvoltage" (the voltage in excess of the breakdown voltage) available across the lamp. If two lamps having different breakdown voltages and equal impedances (the lamps are almost purely capacitive) are placed in series, the applied voltage (prior to breakdown) divides across them in proportion to their impedances (i.e., in inverse proportion to their capacitances). Where the lamps have equal impedances, therefore, the voltage will be equally divided across them. The effective overvoltage will be higher across the lamp with the lower breakdown potential and it will completely fire first. As soon as it breaks down, the voltage across it will drop to its sustaining value, thus increasing the applied voltage to the other lamp which will then break down due to the larger overvoltage.

As applied to the group R lamps in number network 50 of FIG. 1, it can be seen that since the impedance of lamps HTLR, TLR and ULR in parallel is one-third that of lamp BLR, lamp BLR will have approximately three times as much voltage across it as will the parallel combination. This causes lamp BLR to fire first, followed by a sharp decrease in the voltage across it and a corresponding increase in the voltage across the parallel combination. Since lamp HTLR has a lower breakdown potential than lamps TLR and ULR, the overvoltage across lamp HTLR will be higher than that across lamps TLR and ULR. Consequently, lamp HTLR will break down almost immediately after lamp BLR. (The lamps BLT and HTLT of group T operate in an identical manner.)

Lamps HTLR and HTLT thus break down slightly prior to their corresponding TL– and UL– lamps. Lamps TLR and ULR are rated so as to break down when the voltage across them equals the sum of the sustaining voltage of lamp HTLR and the voltage drop in symbolic resistance $R_R$; the latter voltage drop provides the additional voltage which, when added to the sustaining voltage of lamp HTLR, exceeds the breakdown potentials of lamps TLR and ULR. A ring party call will leave contacts PT1 and PT2 normal, and lamps TLR and ULR break down, detecting the identity of the calling ring party by signals transmitted to the identifier circuit 40 in conjunction with the breakdown of lamp HTLR. Conversely, the normal closed state of contact PT1 shorts symbolic resistance $R_T$ out of the tip party circuit T, thus precluding the energization of lamps TLT and ULT.

The presence of such a signal on a directory number terminal thus energizes the appropriate gaseous discharge devices connected thereto, providing the identifier 40 with outputs indicative of all the required class, office and digital information required for complete identification of the calling party.

When the identifier 40 has received this information, it is transmitted to the outpulser portion of the block 30, from whence it proceeds through the ANI trunk 20 to the tandem or toll office (not shown) where registration takes place.

*Detailed description of circuit connections and components (FIGS. 2 through 4)*

FIGS. 2 through 4, when placed together in the manner indicated by FIG. 5, show a detailed view of representative portions of the identifier circuit 40 and the lamp number network 50, and the manner in which these components cooperate with the other segments of the identification system, reproduced as they were in FIG. 1. Two calling lines, L1 and L2, are shown connecting subscriber A, and subscribers B and C, respectively, to the local switching system 10 in FIG. 2. It is to be understood that although the instant invention is generally disclosed in the context of an application to a step-by-step telephone system, this is done merely by way of example and the invention is equally applicable to other switching systems and arrangements. Line L1 is shown to provide subscriber A with individual service to the local office, while line L2 is a two-party line serving both subscribers B and C.

It will be recalled that one of the features of this invention was the capability for the number network to be installed on a more economical basis, such as one group for every 100 numbers in a smaller telephone office which is to be furnished with identification according to the principles of this invention. Number network 50 is such a group, providing automatic identification for the "4300 group," i.e., in an illustrative office, for the telephone directory numbers between CH2–4300 and CH2–4399. It is apparent that few or many of such groups may be installed in a telephone office depending upon the capacity of the office and the necessity for automatic calling line identification therein. It is equally obvious that great economies will be derived from the instant system's capability of being installed only as groups of 100 subscribers are deemed to need this service, rather than being constrained to install one of the prior art arrangements in an office for all 10,000 possible subscribers at one time.

The sleeve leads S– of subscribers whose lines are adapted to be automatically identified by the present arrangement are connected through coupling resistors to directory number terminals in a corresponding lamp number network such as 50. A typical connection is shown from the sleeve wire of line L1 serving subscriber A, whose directory number is assumed herein to be CH2–4309, through resistor R09 to directory number terminal 09 within the 4300 lamp group 50 shown in FIG. 2. To each such directory number terminal are connected four discharge devices which may illustratively be neon tubes. For example, lamps BL09, TL09, UL09 and HTL09 are shown connected to directory number terminal 09. These four lamps are all adapted to be energized in response to the appearance of the appropriate identification signal on their common directory number terminal 09. Since line L1 individually serves subscriber A, there is no need for any sort of selective or discriminatory energization of the lamps.

However, it is seen that line L2 is a two-party line serving both subscribers B and C, whose directory numbers are CH2–4356 and CH2–4390, respectively. The appearance of the identification signal on the sleeve wire S2 of line L2 in response to a particular service request from either subscriber B or subscriber C provides that signal through resistors R56 and R90, respectively.

With reference to both of the corresponding directory number terminals 56 and 90 in FIG. 2, the contacts 43PT–1 and 43PT–2 of the party test relay 43PT are provided for each 100 number lamp group to appropriately energize, in conjunction with negative source 43S2 and additional equipment to be hereinafter described, only the four lamps associated with the party actually calling on the two-party line. Although this arrangement will be more fully described infra, it may now be noted that in each four lamp group, lamp HTL–– has a lower breakdown potential than the other three lamps in the group, the latter lamps illustratively being of the same, higher, breakdown potential.

A detector such at HT43 is provided for every 100 number lamp group and provides information which is common to selected ones of the directory numbers within the group, to the identifier circuit 40. For example, such information pertaining to directory numbers CH2–4309 and CH2–4399 (the subscriber for the latter not being shown) which are both individually serviced ring party lines with common office, thousands and hundreds digits, is furnished to detector HT43 from the cathodes of their respective lamps HTL09 and HTL99 through ring party bus RP. The common office designation and thousands and hundreds digits may then be transmitted to the identifier circuit 40. The use of a common detector such as HT43 for every 100 number network group results in a considerable saving in detecting equipment which will become apparent when the identifier circuit 40 is considered.

The latter circuit, shown in FIGS. 3 and 4, is complete and only one such unit is required for an entire office installation. Although ten tens detectors (TD0–TD9) and the ten units detectors (UD0–UD9) are required, the thousands and hundreds digits are identified on a two-out-of-five basis due to the utilization of common detector HT43; consequently, there are only five thousands detectors (THD0, THD1, THD2, THD4, and THD7) and five hundreds detectors (HD0, HD1, HD2, HD4, and HD7), rather than ten each of those detectors. Detector OD1 for the CH2– office and the class detectors TPD and RPD for tip parties and ring parties respectively are the remaining detectors in the identifier. It is apparent that as many office detectors such as OD1 can be provided as there are offices to be identified, with appropriate connections to be made from common detectors similar in nature to HT43. Furthermore, for reasons of clarity, only two classes of service have been indicated and will be discussed in this description, namely, ring party and tip party classes as represented by the inclusion of only two busses RP and TP respectively in FIG. 2; should additional service classes be necessary or deemed desirable, it is understood that additional ones of such busses may easily be included, with appropriate connections of course being made to a common detector such as HT43 and therefrom to corresponding additional class detectors in the identifier circuit.

The individual detectors in the identifier circuit 40 are identically constituted (except for contacts 43PT–3 and 43PT–4 in class detectors TPD and RPD respectively of FIG. 4) and a description of the components and operation of one of said detectors will therefore suffice for all the detectors. For example, tens detector TD5 in FIG. 3 is energized by the appearance of a relatively positive pulse on the control electrode 15C of that detector. The electrode 15C is normally held at a relatively negative potential substantially equal to the value of common identifier source IS (FIG. 4), coupled to electrode 15C through resistor 13. When a relatively positive signal is coupled to electrode 15C through common digital bus T5 and resistor 12 in response to the energization of one of the lamps TL5– (e.g., lamp TL56 corresponding to subscriber B on line L2 in FIG. 1), PNPN transistor 15 in detector TD5 becomes conductive. Such a transistor operates in general accordance with the principles disclosed, for example, in I. M. Ross Patent 2,877,359, issued March 10, 1959.

When PNPN transistor 15 in detector TD5 thereby becomes conductive, current is momentarily permitted to flow between a relatively positive potential source (not shown) in the outpulser 30 to relatively negative source IS in the identifier circuit 40 over a path which includes translating diodes DT51 and DT52, PNPN transistor 15 (bypassing blocking capacitor 17) and resistor 16. Appropriate corresponding registration equipment in the outpulser is thereby operated.

After the appropriate lamps have been energized and enabling signals have been transmitted from both the HT43 detector and from the common digital busses such as T0–T9 and U0–U9 to the corresponding detectors in the identifier circuit 40, this information is then transmitted to the outpulser 30 (FIG. 2), and thence over the ANI outgoing trunk 20 to the remote or tandem office by suitable transmitting means such as multifrequency pulsing. In the remote office, a permanent record is made of the calling party's number in order to properly charge the ensuing call; the outpulser and identifier connector 30 are then disconnected from their corresponding circuit blocks and a talking path is set up between the calling and called subscriber.

*Detailed description of the identification arrangement*

In the following description of the identification process, part I applies to a typical individual or one party line such as L1, serving subscriber A, and part II applies to a typical two-party line L2, serving subscribers B and C. With regard to the assumption made at the beginning of the general description supra, let it be further assumed in order to facilitate this description that the particular service request to which the instant arrangement is responsive is a toll call, illustratively of the direct distance dialing type. Such a request, when received by the remote tandem or toll office, serves to energize the identifier connector 30 and the ANI outgoing trunk 20 in the manner indicated supra. This results in the application of the identification signal to the appropriate sleeve wire of the calling line after having been transmitted thereto through the connections set up in the local switching system 10.

In some offices, a local message register may also be connected to this sleeve wire, and it is therefore necessary that a toll call identification signal applied to the sleeve energize only the lamp network and not the message register. To achieve this end, a high voltage low energy pulse may advantageously be used for the toll identification signal. Illustratively, this pulse may be of a duration of 100 microseconds with a magnitude of 300 volts.

(I) *Identification of an individual line—Line L1 serving subscriber A*

When subscriber A with directory number CH2–4309 initiates a toll call to which the instant arrangement is adapted to be responsive, the toll identification signal emerges on sleeve lead S1 of calling line L1. This signal is transmitted through resistor R09 to the directory number terminal 09 in the 4300 lamp group 50. The four lamps connected to this directory number terminal, namely lamps BL09, TL09, UL09 and HTL09 will thereby all be energized in the following manner. Lamp BL09, which serves as a buffer or blocking lamp for the other three lamps, has its cathode connected to the common anodes of lamps TL09, UL09 and HTL09. In order for these lamps to fire, their cathodes must be suitably terminated so that the voltage drop across the lamps exceeds their respective breakdown potentials. The cathode of tube HTL09 is cross-connected to ring party bus RP which connects through ring party diode RPD1 to potential source 43S1 in detector HT43 via resistors 43R1, 43R2 and 43R3; a parallel connection can be traced from bus RP through diode RPD2 over ring party lead RPL and resistors 12 and 13 in class detector RPD to common identifier source IS, which may conveniently be of the same illustrative value as source 43S1. These electrical paths provide the proper potential termination for lamp HTL09, thereby causing both lamps BL09 and HTL09 to break down due to the application of the illustrative 300-volt, 100-microsecond pulse in conjunction with the negative potentials provided by sources 43S1 and IS (these may illustratively be —48 volts) across them.

The cathodes of lamps TL09 and UL09 are connected by common digital busses T0 and U9 respectively to common potential source IS in the identifier circuit. These connections are provided from the cathodes of these lamps through the digital busses and thence through resistors such as 12 and 13 in each of the corresponding detectors TD0 and UD9 in the identifier circuit 40. It is now apparent that the requirement for the firing of lamps TL09 and UL09 is that the sustaining potential of lamp HTL09, when added to the voltage drop across the parallel combination of resistors 43R1, 43R2, and 43R3 connected in series and serially connected resistors 12 and 13 of class detector RPD in the identifier circuit, be greater than the individual breakdown potentials of lamps TL09 and UL09. This is seen from the fact that since individual lines, such as L1 serving subscriber A, are assigned ring party class significance, party test relay 43PT is normal and unoperated, so that contacts 43PT–1 and 43PT–3 are closed, while contacts 43PT–2 and 43PT–4 are open. The two parallel paths delineated supra are seen to exist respectively from ring party bus RP to negative potential source 43S1 in detector HT43 and to negative potential source IS in the identifier circuit 40. The latter path bypasses normally open contacts 43PT–2 and 43PT–4 as it proceeds over conductor RPL to common potential source IS in the identifier circuit 40 after having passed through resistors 12 and 13 in ring party class detector RPD.

Lamps TL09 and UL09 are arranged to have individual breakdown potentials (illustratively 110 volts) which are exceeded by the sum of the sustaining voltage of lamp HTL09 and the voltage drops across the parallel resistor combinations delineated spura. Therefore, lamps TL09 and UL09 ionize and the detection of the calling party's directly number may be completed.

The breakdown of lamp HTL09 causes a positive pulse to be transmitted along ring party bus RP and through diode RPD1 to the control electrode 43C of PNPN transistor 43TR through resistor 43R1 of detector HT43. This can be seen from the fact that negative potential source 43S1 normally maintains that electrode at a substantially negative potential, keeping the transistor nonconductive in the absence of the energization of any of the lamps HTL– –. When the PNPN transistor 43TR begins to conduct in response to the firing of lamp HTL09 ground is connected through resistor 43R4 and the two active electrodes of the transistor to output conductor 430P of detector HT43.

Each common detector, such as HT43, which serves a 100 number lamp group, has its output conductor, such as 430P, connected to five coupling diodes, namely 430FF1, 43TH1, 43TH2, 43H1 and 43H2. Connections from the cathodes of each of these diodes to the office, thousands and hundreds detectors in the identifier circuit 40 represent semipermanent cross-connections or "strappings" to specific ones of said detector. For example, the relatively positive output signal appearing on output lead 430P is transmitted through diode 430FF1 and thence over strapping connection OFF1 to the appropriate office detector, in this case detector OD1 which corresponds to the CH2– telephone office.

The thousands and hundreds digit of a particular calling party are similarly identified by cross-connections or strappings on a two-out-of-five basis from a common detector such as HT43 to the appropriate thousands and hundreds detectors. In the particular example under consideration, the thousands digit of the calling party is identified by the passage of the positive output signal from output lead 430P through diodes 43TH1 and 43TH2 and thence across conductors TH1 and TH2 respectively to thousands detectors THD0 and THD4 respectively. In the well-known two-out-of-five code, the combination represented by the detectors THD0 and THD4 results in the detection of the thousands digit 4 of the calling party (subscriber A) whose full directory number it will be recalled is CH2–4309. The hundreds digit is identified in a manner essentially identical to that described with respect to the thousands digit. The same output signal that appears on output lead 430P adverted to supra is transmitted through diodes 43H1 and 43H2, across strappings H1 and H2 respectively to hundreds detectors HD1 and HD2 respectively, thereby resulting in the energization of the PNPN transistors 15 in each of the detectors. The detection of the hundreds digit 3 of the calling party is thereby also effected in accordance with the well-known two-out-of-five arrangement.

Class of service information is also directly obtainable if so desired based on the ionization of lamp HTL09. It should again be noted that since individual lines are assigned ring party significance, the standard party test relay 43PT (not shown) will not be operated when a particular service request to which the instant invention is adapted to be responsive is initiated. Therefore, contacts 43PT–1 through 43PT–4 will all be normal. A path may therefore be traced for a positive pulse from the cathode of tube HTL09, over ring party bus RP, through ring party diode RPD2, over conductor RPL (bypassing normally open contact 43PT–2 which, if closed, might divert the signal to negative potential source 43S2), and to PNPN transistor 15 of ring party detector RPD, since make contact 43PT–4 is in its normal condition, i.e., open. Ring party detector RPD is therefore energized and the class information may be transmitted to the outpulser over output lead RPO.

To this point, the class, office, thousands and hundreds information of the calling party has been identified or at least detected; that is, the identification equipment "recognizes" that the calling party is a ring party the directory number of which is CH2–43XX, where XX can represent any two-digit combination between 00 and 99. The tens and units digits identification, a process similar to the identifications already described, will now be discussed.

The energization of lamps TL09 and UL09, described supra, results in the detection and subsequent registration of the tens and units digits of the calling party respectively. When lamp TL09 fires, a positive pulse appears on common tens digital bus T0 and is transmitted thereacross to the input lead to tens detector TD0, thereby energizing said detector. Similarly, when units lamp UL09 breaks down, a signal is transmitted across common units bus U9 to the input to the units detector UD9. Detectors TD0 and UD9 having been energized, the conversion of information therefrom to the outpulser circuit 30 is made in a well known manner on a two-out-of-five basis illustratively utilizing diodes connected by pairs to the output conductors of each of the units and tens detectors. The identification process is thereby completed with the detection of the tens digit 0 and the units digit 9 just described. All the desired information relating to the calling party has thereby been obtained.

(II) *Identification of the calling party on a two-party line—Subscribers B and C on line L2*

The use of two-party lines is quite widespread throughout all telephone systems and it is therefore imperative that an identification arrangement be capable of accurately identifying only the party on the two-party line which originates a particular service request to avoid erroneous charging. Subscribers B and C share access to the local switching system 10 over two-party line L2 and a single connection is shown from their common sleeve S2 into the 4300 lamp group 50. When subscriber B, whose directory number is CH2–4356, initiates, illustratively, a toll call service request, the calling party's number is identified in a manner identical to that described with relation to subscriber A supra, since subscriber B is assigned ring party designation by the connection of the cathode of its associated lamp HTL56 to ring party bus RP. Therefore, the present description of the identification of a calling party on a two-party line will be confined to the initiation of a service request by tip party subscriber C whose directory number is CH2–4390.

Upon the initiation of such a request by subscriber C, and the subsequent appearance of the toll identification signal on common sleeve S2, a signal is transmitted to directory number terminals 56 and 90 through resistors R56 and R90 respectively. An obvious requisite of the identification arrangements is that only the calling party's directory number (CH2–4390) be detected and registered. The first step in providing such distinction between the parties on a two-party line involves the operation of the standard and well-known party test equipment, which may be, for example, party test relay 43PT common to the 4300 lamp group 50. Since subscriber C is assigned tip party significance, demonstrated by the connection of the cathode of its associated lamp HTL90 to tip party bus TP, party test relay 43PT operates by the closure of symbolic switch 43SW, providing a path between ground and source 43PTS through the winding of relay 43PT. Party test relay 43PT and its accompanying equipment are so shown by way of example, and suitable automatic party test apparatus such as that shown in the above-mentioned Cahill et al. patent may readily be utilized herein. This results in the operation of responsive contacts 43PT–1 and 43PT–2 associated with negative potential source 43S2 and contacts 43PT–3 and 43PT–4 associated with class detectors TPD and RPD respectively.

The initial appearance of the illustrative 300 volt 100 microsecond identification signal on the two directory number terminals associated with the two-party line L2 results in the energization of lamps BL56 and HTL56 associated with subscriber B and also in the energization of lamps BL90 and HTL90 corresponding to the actual calling party, namely subscriber C. This is achieved in general accordance with the "overvoltage" principle described supra. However, in accordance with one feature of this invention, the energization of lamp HTL56 associated with the "unwanted" party (subscriber B) on two-party line L2 causes no individual identification. This is seen from the connection of the cathode of lamp HTL56 to ring party bus RP through ring party diode RPD2 and through now closed make contact 43PT–2 to potential source 43S2. That is, no improper class detection is permitted since the above-described path to negative source 43S2 acts to "divert" the signal from the cathode of tube HTL56 away from the class detection circuitry. However, since break contact 43PT–1 is now open in response to the operation of relay 43PT, a complete electrical path may be traced for the detection of the class information of the calling tip party (subscriber C with directory number CH2–4390) from the cathode of energized lamp HTL90 to tip party bus TP and thence through diode TPD2 and across conductor TPL to input resistor 12 of tip party detector TPD in the identifier circuit 40. Class detector TPD is therefore energized since break contact 43PT–3 is now operated. Similarly, if any stray identification signal should spuriously appear on lead RPL, it will nevertheless be unable to energize ring party detector RPD, since the closed state of make contact 43PT–4 diverts any such signal from conductor RPL to common negative potential source IS in the identifier circuit 40. Detection of the tip party significance of subscriber C is therefore achieved.

The energization of lamp HTL90, the cathode of which is connected through tip party bus TP and diode TPD1 to resistor 43R1 in detector HT43 effects the energization of the common detector HT43. The presence of the resultant relatively positive signal on the control electrode 43C of PNPN transistor 43TR of common detector HT43 results in the detection and subsequent registration of the office, thousands and hundreds digits by the detection circuitry in the identifier circuit 40 in a manner precisely identical to that described supra with relation to subscriber A. That is, the office detector OD1, the thousands detectors THD0 and THD4, and the hundreds detectors HD1 and HD2 are all energized subsequent to the appearance of a positive output signal on output lead 430P of detector HT43. This furnishes the identifier circuit 40 with the information that the calling party is a tip party with directory number CH2–43XX.

One of the unique and novel features of the instant invention concerns the operation of energizing only the tens and units lamps corresponding to the calling party, while leaving the tens and units lamps associated with the unwanted party on the two-party line nonconductive. This selective energization is achieved by utilizing lamps of a relatively lower breakdown potential in the HTL-- position of each individual lamp group. For example, lamps BL56, TL56 and UL56 may all be of the same firing potential, illustratively approximately 110 volts, while lamp HTL56 is characterized by a relatively lower breakdown potential, illustratively 70 volts. In order to prevent the energization of lamps TL56 and UL56 associated with the "unwanted" party (subscriber B) on two-party line L2 and to correspondingly allow the energization of lamps TL90 and UL90 associated with the actual calling party (subscriber C) on line L2, lamps TL-- and UL-- of an "unwanted" party (such as lamps TL56 and UL56) are arranged not to break down when the only voltage across their terminals is the sustaining voltages of the associated HTL-- lamp (such as HTL56). Similarly, the tens and units lamps TL-- and UL-- of the calling party (e.g., lamps TL90 and UL90) will break down when the voltage across their terminals equals the sum of the sustaining voltage of the corresponding HTL-- lamp (e.g., HTL90) plus the voltage drop across certain resistors connected to the cathode of the calling party's HTL-- lamp (e.g., coupled to lamp HTL90 are series-connected resistors 43R1, 43R2 and 43R3, connected in parallel with series-connected resistors 12 and 13 of detector TPD).

To more specifically illustrate this unique feature, it will first be indicated how the lamps TL56 and UL56 of the "unwanted" party do not ionize. The cathode of energized tube HTL56 connects directly and solely to negative potential source 43S2 over a path which includes ring party bus RP, diode RPD2 and closed make contact 43PT–2. Since the cathodes of tubes TL56 and UL56 connect to common potential source IS in the identifier circuit 40 through their respective tens and units identifiers TD5 and UD6, and since negative potential source IS is conveniently chosen to be equal in value to source 43S2, the voltage appearing across the parallel combination of lamps TL56 and UL56 is substantially equal to the sustaining voltage of lamp HTL56. This sustaining voltage is illustratively approximately 60 volts and is insufficient to fire the tubes TL56 and UL56.

However, as regards the calling party, similar voltage summations cause the energization of the desired party's (subscriber C) tens and units lamps TL90 and UL90 respectively. It may be seen that the cathode of energized tube HTL90 is connected to negative potential sources 43S1 in detector HT43 and IS in the identifier circuit 40 over parallel-connected impedance paths to be traced out below. The first of these paths follows from the cathode of tube HTL90 across tip party bus TP and through diode TPD1 to negative potential source 43S1 through the serial combination of resistors 43R1, 43R2, and 43R3. The other parallel path to the advantageously equivalent negative potential source IS in the identifier circuit 40 may also be traced from the cathode of tube HTL90, over tip party bus TP, through diode TPD2, across lead TPL (bypassing negative potential source 43S2 due to the open condition of break contact 43PT–2) to common identifier source IS through the serial combination of resistors 12 and 13 of class detector TPD due to the similar open condition of break contact 43PT–3. Moreover, the cathodes of tubes TL90 and UL90 are connected to common potential source IS in the identifier circuit 40 through their respective tens and units detectors TD9 and UD0. It is thus apparent that the voltage appearing across the terminals of tubes TL90 and UL90 in parallel is substantially equal to the sustaining voltage of tube HTL90 *plus* the voltage drop across the parallel combination of serially connected resistors 43R1, 43R2, and 43R3 in detector HT43, with serially connected resistors 12 and 13 in class detector TPD of the identifier circuit 40. In accordance with the instant invention, the sum of these voltages across the terminals of lamps TL90 and UL90 corresponding to the calling party is sufficient to energize these lamps.

When lamps TL90 and UL90 break down, relatively positive signals are transmitted from the cathodes of each of these tubes across common digital busses T9 and U0 respectively to tens detector TD9 and units detector UD0 in the identifier circuit 40. These two detectors are therefore energized in a manner identical to that described supra and detection of the tens digit 9 and the units digit 0 takes place. This completes the identification of the directory number of the calling party on the two-party line L2, furnishing the outpulser 30 with the electrical information that the calling party, subscriber C, is a tip party with directory number CH2–4390.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a central office; a plurality of two-party lines connected to said office; identification means comprising first and second discharge means individual to each of said parties and having a first breakdown potential, and third and fourth discharge means connected to said first and second discharge means respectively and having a second relatively higher breakdown potential; means in said office responsive to a service requesting one of said lines for jointly energizing said first and second discharge means; and activating means responsive to said service request for selectively introducing a voltage drop in series with said first and second discharge means to selectively energize said third and fourth discharge means in accordance with the party identification of said service requesting line.

2. A telephone system in accordance with claim 1 wherein said first and third discharge means correspond to a first party on said service requesting two-party line and said second and fourth discharge means correspond to a second party on said line, and wherein said activating means includes first and second impedance means coupled respectively to said first and said second discharge means, and party test means for shunting out said first impedance means when said second party initiates said service request and for shunting out said second impedance means when said first party initiates said service request.

3. A telephone system in accordance with claim 1 wherein the sum of the sustaining voltage of said first discharge means and said voltage drop in series with said first discharge means exceeds said second breakdown potential.

4. In a calling line identification circuit for identifying the directory number of a calling party on a two-party line, first discharge means individual to each of said parties on said two-party line and having a first predetermined breakdown potential, second and third discharge means connected to each of said first discharge means and in parallel with each other, said second discharge means having a relatively lower breakdown potential than said first and said third discharge means, means for applying an identification signal to said line to energize said first and said second discharge means, and means for introducing a voltage drop in series with said second discharge means of said calling party to energize said third discharge means thereof, said introducing means applying to said last-mentioned third discharge means a voltage that is the sum of the sustaining voltage of said second discharge means and said voltage drop.

5. A circuit for identifying the telephone number of each party of a plurality of multiparty lines comprising a first discharge means coupled to the sleeve lead of each of said lines for each party identity, all of said first discharge means having a first predetermined breakdown potential, a second discharge means for each said party identity coupled to each said first discharge means and having a second relatively lower breakdown potential and a predetermined sustaining voltage, at least one additional discharge means of said first breakdown potential connected in parallel with each said second discharge means; means responsive to a service requesting one of said parties on any of said lines for placing an identification signal on said sleeve lead thereof to energize each said first discharge means coupled thereto, and means for energizing said second discharge means before said additional discharge means, said energizing means including impedance means for each party identity connected in series with each of said second discharge means for providing an enabling voltage drop; means for detecting the party identity of said service requesting one of said parties, and means controlled by said detecting means for shunting out said impedance means in series with all said second discharge means associated with each party identity except the party identity detected by said detecting means, said enabling voltage drop provided by the impedance means associated with said detected party identity being in series with the sustaining voltage of said second discharge means to energize said additional discharge means.

6. In a telephone system having a local office, a plurality of two-party telephone lines appearing in said office and means for placing an identifying signal on one of said lines, the combination comprising a first plurality of discharge tubes connected individually to each of said parties at said office, said first discharge tubes having a first predetermined breakdown voltage and a predetermined sustaining potential, a second plurality of discharge tubes connected to each of said first plurality of discharge tubes and having a second relatively higher breakdown voltage, means responsive to a service request from a calling party on one of said lines for energizing all said first plurality of discharge tubes connected to said one of said lines, and means including said first plurality of discharge tubes energized to exhibit said sustaining potential for energizing said second plurality of discharge tubes corresponding to said calling party and for preventing the energization of said second plurality of discharge tubes corresponding to the noncalling party on said one of said lines.

7. A number identifying apparatus for use in a telephone system having a central office and a plurality of two-party calling lines appearing therein, said apparatus comprising first and second discharge means individual respectively to each of said parties and having a predetermined breakdown voltage, third and fourth discharge means having a relatively higher breakdown voltage connected respectively to said first and to said second discharge means, said third and said fourth discharge devices having different telephone number significance, means in said office responsive to a service request from either party on one of said lines to jointly energize said first and second discharge means, means for obtaining the party identification of said service requesting line and means for selectively energizing said third and fourth discharge means in accordance with the party identification of said service requesting line.

8. A number identifying apparatus in accordance with claim 7 wherein said selectively energizing means includes means responsive to said obtaining means for inserting an impedance in series with said first discharge means.

9. In a telephone system, a local office; a plurality of telephone lines each having at least two parties thereon connected to said office; means for placing an identifying signal on one of said lines in response to a service request from a calling party thereon; and number identification means comprising first and second discharge means of a first breakdown potential connected to each of said lines and operative in response to the application of said identifying signal to identify directory number digits common to both of said parties on said service requesting line, and at least third discharge means of a second relatively higher breakdown potential coupled to each of said first and second discharge means respectively and selectively responsive to the operation of said first and said second discharge means respectively to identify particular ones of said directory number digits uniquely corresponding to said calling party.

10. In an automatic calling line identification circuit for small telephone systems, a local office; a plurality of calling lines connected to said office, at least some of said lines having more than one telephone subscriber thereon; means for placing an identifying signal on selected ones of said lines in response to a service request therefrom; and a plurality of breakdown devices having different breakdown levels connected to each of said lines, those having the lower of said levels being energized responsive to said identifying signal to selectively energize only those of said devices having the higher of said levels which correspond to the one of said subscribers initiating said request.

11. In an automatic telephone system, a central office; a plurality of two-party calling lines connected to said office; number identification means in said office for identifying the digits of said parties comprising first and second discharge means corresponding to each of said parties and connected to the sleeve lead of each of said lines and having a predetermined breakdown voltage, third and fourth discharge means connected to said first and second discharge means respectively and having a relatively higher breakdown voltage, means in said office for placing an enabling signal on said sleeve lead in response to a service request from a calling party on one of said lines to energize said first and second discharge means, and means for thereafter selectively energizing said third discharge means and for preventing the energization of said fourth discharge means in accordance with the party identification of said service requesting party; and a first plurality of detecting means common to a plurality of said first and second discharge means for detecting the class of service, office, thousands and hundreds ones of said digits in response to the energization of said first and said second discharge means, and a second plurality of detecting means responsive to said selective energizing of said third discharge means for identifying the tens and units ones of said digits.

12. In a telephone system, a local office; a plurality of two-party calling lines connecting party subscribers to said office; and means for obtaining the directory number of each of said parties on any of said lines responsive to a service request therefrom comprising first and second discharge means individual respectively to each of said parties having a first firing potential and connected to the sleeve lead of each of said lines, third and fourth discharge means having a second relatively higher firing potential and connected respectively to said first and said second discharge means, means for placing an enabling signal on said sleeve lead, means for decreasing the potential available across all of said fourth discharge means relative to the potential available across all of said third discharge means, and means responsive to said enabling signal and to said relative decrease in voltage to energize only said third discharge means corresponding to said service requesting party.

13. In a telephone system, a local office; a plurality of two-party calling lines connecting tip and ring party stations to said office; means in said office for determining the individual directory number of said stations on said lines comprising first and second breakdown means coupled to each of said lines and having a first predetermined breakdown potential, third and fourth breakdown means coupled respectively to said first and second breakdown means and having a second relatively greater breakdown potential, means for grouping said first and second plurality of said breakdown means including a first bus common to all said first breakdown means and a second bus common to all of said second breakdown means, means for obtaining the party identification of any calling party in each of said groupings; means controlled by said obtaining means for selectively changing the impedance of said first bus relative to said second bus, and means for placing an identifying signal on any of said lines to selectively energize the one of said third and fourth breakdown means coupled to said breakdown means connected to the higher impedance one of said first and said second bus.

14. In a telephone system, a multiparty line having a tip party and a ring party connected thereto, a first breakdown device connected to said line for each of said parties, a second breakdown device connected in series with each said first breakdown device, a third breakdown device shunt connected to the series connection for each of said parties, said third breakdown device having a relatively greater breakdown potential than said second breakdown device, means for placing an enabling signal on said line to break down all said first and second breakdown devices connected thereto, and means for selectively connecting an impedance in series with said second breakdown devices to determine the potential available for breakdown of said third device on breakdown of said second device.

15. In a telephone system, the combination of claim 14 wherein each of said devices comprises a gaseous discharge device.

16. In a telephone system, the combination of claim 14 wherein said means for selectively connecting said impedance includes means for determining the ring and tip party connection of said parties and further including means responsive to said second device breakdown for registering line identification information and means responsive to said party connection determination means for controlling said information registering means.

No references cited.

ROBERT H. ROSE, *Primary Examiner.*

WALTER L. LYNDE, *Examiner.*